United States Patent
Tween et al.

(10) Patent No.: US 9,319,961 B2
(45) Date of Patent: Apr. 19, 2016

(54) PORTABLE WIRELESS COMMUNICATIONS APPARATUS

(75) Inventors: Larry Brian Tween, Chelmsford (GB); Jonathan Pinto, Colchester (GB)

(73) Assignee: BAE SYSTEMS plc, London (GB)

( * ) Notice: Subject to any disclaimer, the term of this patent is extended or adjusted under 35 U.S.C. 154(b) by 42 days.

(21) Appl. No.: 14/343,611

(22) PCT Filed: Sep. 5, 2012

(86) PCT No.: PCT/GB2012/052170
§ 371 (c)(1),
(2), (4) Date: Mar. 7, 2014

(87) PCT Pub. No.: WO2013/038147
PCT Pub. Date: Mar. 21, 2013

(65) Prior Publication Data
US 2014/0226645 A1    Aug. 14, 2014

(30) Foreign Application Priority Data
Sep. 13, 2011    (GB) .................................. 1116436.5

(51) Int. Cl.
*H04W 4/00*    (2009.01)
*H04L 12/28*   (2006.01)
*H04W 40/00*   (2009.01)
*H04W 84/00*   (2009.01)
(Continued)

(52) U.S. Cl.
CPC ............. *H04W 40/00* (2013.01); *G06F 1/163* (2013.01); *G06F 1/1698* (2013.01); *H01Q 1/273* (2013.01); *H01Q 9/285* (2013.01); *H04B 1/385* (2013.01); *H04W 84/005* (2013.01); *H04W 88/08* (2013.01)

(58) Field of Classification Search
CPC ...................................................... H04W 40/00
USPC ........................................................... 370/338
See application file for complete search history.

(56) References Cited

U.S. PATENT DOCUMENTS 5,602,854 A    2/1997    Luse et al.
7,672,695 B1   3/2010    Rainnie et al.
(Continued)

FOREIGN PATENT DOCUMENTS

| | | |
|---|---|---|
| EP | 2355369 A1 | 8/2011 |
| WO | 2006102537 A2 | 9/2006 |
| WO | 2013038147 A1 | 3/2013 |

OTHER PUBLICATIONS

International Preliminary Report on Patentability and Written Opinion of the International Searching Authority received for Patent Application No. PCT/GB2012/052170, mailed on Mar. 27, 2014, 7 pages.
(Continued)

*Primary Examiner* — Gerald Smarth
(74) *Attorney, Agent, or Firm* — Finch & Maloney PLLC

(57) ABSTRACT

A small, portable wireless router combined with a wideband, wearable antenna supports a local wireless network created on the move for exchanging information between multiple personnel spread over a useful geographic area. Multiple information sources of different types, such as cameras and GPS, can use the network to send information feeds to mobile users with interface devices such as smartphones that can deliver multiple feeds at the same time to the user. Devices connected to other networks, such as information processing devices at fixed operating bases, can deliver information feeds to the network.

22 Claims, 3 Drawing Sheets

(51) Int. Cl.
*H04B 1/3827* (2015.01)
*G06F 1/16* (2006.01)
*H01Q 1/27* (2006.01)
*H01Q 9/28* (2006.01)
*H04W 88/08* (2009.01)

(56) References Cited

U.S. PATENT DOCUMENTS

| | | | |
|---|---|---|---|
| 2005/0036622 A1* | 2/2005 | Hay et al. | 380/270 |
| 2007/0049192 A1* | 3/2007 | Hoffmann et al. | 455/3.02 |
| 2007/0200914 A1* | 8/2007 | DuMas et al. | 348/14.01 |
| 2007/0218868 A1* | 9/2007 | Schefczik et al. | 455/404.1 |
| 2007/0273504 A1* | 11/2007 | Tran | 340/539.12 |
| 2008/0158087 A1* | 7/2008 | Rofougaran | H01L 23/66 343/810 |
| 2009/0167945 A1* | 7/2009 | Tsui et al. | 348/552 |
| 2009/0215436 A1* | 8/2009 | Howard et al. | 455/414.3 |
| 2010/0056166 A1* | 3/2010 | Tenny | 455/450 |
| 2011/0018731 A1 | 1/2011 | Linsky et al. | |
| 2011/0110254 A1* | 5/2011 | Ji et al. | 370/252 |
| 2011/0243040 A1* | 10/2011 | Khan et al. | 370/280 |
| 2012/0007719 A1 | 1/2012 | Ida et al. | |

OTHER PUBLICATIONS

International Search Report received for Patent Application No. PCT/GB2012/052170, mailed on Jan. 2, 2013, 4 pages.

GB Intellectual Property Office Search Report under Section 17(5) received for GB Patent Application No. 1116436.5 date of search Jan. 23, 2012, 4 pages.

Rantanen, et al., "Data transfer for smart clothing: requirements and potential technologies," Wearables and Photonics, 2005, pp. 198-222.

Hum, Alex P.J., "Fabric area network—a new wireless communications infrastructure to enable ubiquitous networking and sensing on intelligent clothing," Elsevier Science Publishers B.V., Amsterdam, NL, vol. 35, No. 4, Mar. 1, 2001, pp. 391-399.

"WLAN Wearable Antenna PRR Wearable Antenna," Octane Wireless, Jan. 3, 2007, pp. 1-2. Retrieved from the Internet on Dec. 13, 2010; URL:http://www.octanewireless.com/pdf/Octane_Wireless_WLAN_Datasheet.pdf.

* cited by examiner

PORTABLE WIRELESS COMMUNICATIONS APPARATUS

The present invention relates to portable wireless communications apparatus for multiple users. Embodiments of the invention find particular application in field apparatus involving multiple data types.

Portable wireless communications apparatus has been developed for use in a variety of applications, including for example police operations, military fieldwork and fire-fighting. The simplest is perhaps the field radio where multiple users tune into a shared amplitude or frequency modulated radio signal so that each user can transmit or receive sequentially, giving half duplex audio communications between all the users.

Apparatus is also being developed to benefit from portable video equipment in co-ordinating personnel in difficult and potentially fast-changing environments such as burning buildings where visibility is low or in pursuit activities. Wireless cameras, audio equipment and GPS devices carried by the personnel can deliver images, voice and positional information to a control point outside the environment where the information can be assessed and used to direct the personnel as necessary.

According to an aspect of embodiments of the present invention, there is provided a portable wireless network comprising:

i) at least one portable router for providing routing of information between multiple wireless devices in a local area network; and ii) at least one wearable antenna connected to the router for receiving and/or transmitting the information between the wireless devices via the network.

Routers are adapted to route data packets and thus the wireless devices are preferably devices having packet-based communications capability. In Internet-based networks, a router is adapted to route the data packets according to the Internet Protocol (IP) address and can support throughput by ensuring delivery of packets to nodes, such as the wireless devices, which are ready to receive. This requires two way negotiation and provides full duplex transmission.

Preferably, the router provides a wireless access point. The access point allows the network to be run in infrastructure mode which is easy to set up to allow multiple nodes, such as the wireless devices, to talk to each other.

As well as providing an access point, routers will route data packets between networks and can therefore support connection of the wideband area network to other networks. For example, a router might provide connection to a mobile telephony network.

Small, portable wireless routers are known for use when travelling, usually to get Internet access. These are intended for use for example in hotel rooms or conference facilities and support short range communications, up to about 10 m. They can also incorporate wireless access points which will support a local network amongst wireless devices.

It has been recognised in making the present invention that there can be major benefits in extending the range of a physically small and light router by using a wearable antenna, together with radiated power adjustments. By extending the range to perhaps 100 m or more, the router can support a local wireless network created on the move for exchanging information between multiple personnel spread over a useful geographic area. This greatly expands the potential capabilities of such a network.

Preferably the network supports wideband communications and the antenna comprises a wideband antenna. It then remains possible to offer full duplex, wideband communications over the extended range, known wideband communication protocols (e.g. COFDM, DSSS) being resistant to jamming. By adding encryption, such a network can also offer very good security.

Lastly, because the antenna is wearable, it becomes possible to site the antenna separately from the router. The physical dimensions and weight of a router tend to limit where it can conveniently be located on a wearer. If the router communicates via an integral antenna, the antenna necessarily suffers from the same limitations and its positioning, together with electrically small size, can limit coverage and efficiency. Using a separate wearable antenna means the antenna can be more freely located without impeding the wearer's progress, for instance so as to avoid blocking the antenna in its expected use in the field. In a military application for example, the wearer may have to take cover by lying down. By locating a wearable antenna on the shoulder or helmet, it is less likely to be blocked while the associated router might be entirely covered.

A wide range of device types are now designed for wireless transmission, for example by conforming to a protocol such as the 802.11 set of IEEE ("Institute of Electrical & Electronics Engineers, Inc") standards for wireless networking transmission. Multiple feeds can be received and transmitted in the network for example by use of packet switching and multiple sub-carriers within a single communications channel according to the 802.11n protocol and embodiments of the invention can support on-demand, peer-to-peer communications based on existing communication protocols.

Embodiments of the invention might include two or more portable wireless information devices for generating digital information and transmitting it to the router for transmission on the network.

The two or more portable wireless information devices preferably comprise one or more of: cameras; microphones; GPS equipment; compasses; gyroscopes and accelerometers. These devices are between them capable of providing at least video, audio and positional data in digital form, for exchange via the network.

Embodiments of the invention might further include two or more portable wireless user communication interfaces for receiving the digital information via the network.

A user interface for use in a portable wireless network according to an embodiment of the invention is preferably capable of delivering to the user more than one information feed at a time and also preferably more than one type of information feed. For instance, a user interface might deliver video, audio and/or data feeds. A particularly appropriate device is a smartphone although other device types might be suitable. Preferred requirements are that the device:

supports a packet-based wireless communication protocol has a visual display component, and has an operating system in the manner of a computer and can therefore support compatible software applications.

Smartphones have these characteristics. Having a screen as a display component means the smartphone can deliver video and data as well as audio to the user and one or more software applications can be loaded to provide customisation of the smartphone. For example, it might be preferred that the user can select one or more feeds from the network for delivery at any one time. Lastly, a smartphone is small enough to be worn on the wrist which is particularly convenient in the field since it leaves both hands free in most situations while the display component can usually be brought into view quickly and conveniently.

The portable wireless network of embodiments of the invention is well-suited to use between moving groups of people such as military patrols. In this example, members of the patrol might carry information devices which send information feeds to an antenna and router worn/carried by a patrol leader. The patrol leader might then for example have access to camera feeds showing him what each of his patrol members can see, GPS signals giving him their individual locations and audio feeds allowing them to speak to him.

Preferably, user communication interfaces are provided for each other member of the patrol. So far as the software applications on those interfaces allow, each member of the patrol can then receive information feeds from other members of the patrol, including the patrol leader.

Embodiments of the invention can also accommodate communication delivered to the network from fixed installations such as those at a forward operating base. These installations might include more complex or faster data processing power than might be available in the field, such as mapping and planning tools, or might simply be in receipt of information not otherwise available to users of the network. Information feeds from these sources, which might form or be connected to an independent local area network (LAN), might be particularly useful for real-time decisions in the field.

Embodiments of the invention provide a network that can be taken in its entirety into a difficult environment and used for the sharing of information feeds generated by devices carried by users, amongst those users. The feeds, such as cameras, can be multiplexed in real time onto the network and every user, potentially, can select to receive two or more feeds at the same time. Additional feeds can be fed onto the network from outside the difficult environment. Further, for instance by using repeaters to extend its range, a network according to an embodiment of the invention could be used in environments such as mining, offshore oil and gas exploration and the like.

A portable wireless network will now be described as an embodiment of the invention, by way of example only, with reference to the following figures in which:

FIG. 4 shows a smartphone screen in use as part of a user interface delivering information from a network as shown in FIG. 1.

Figure 1:
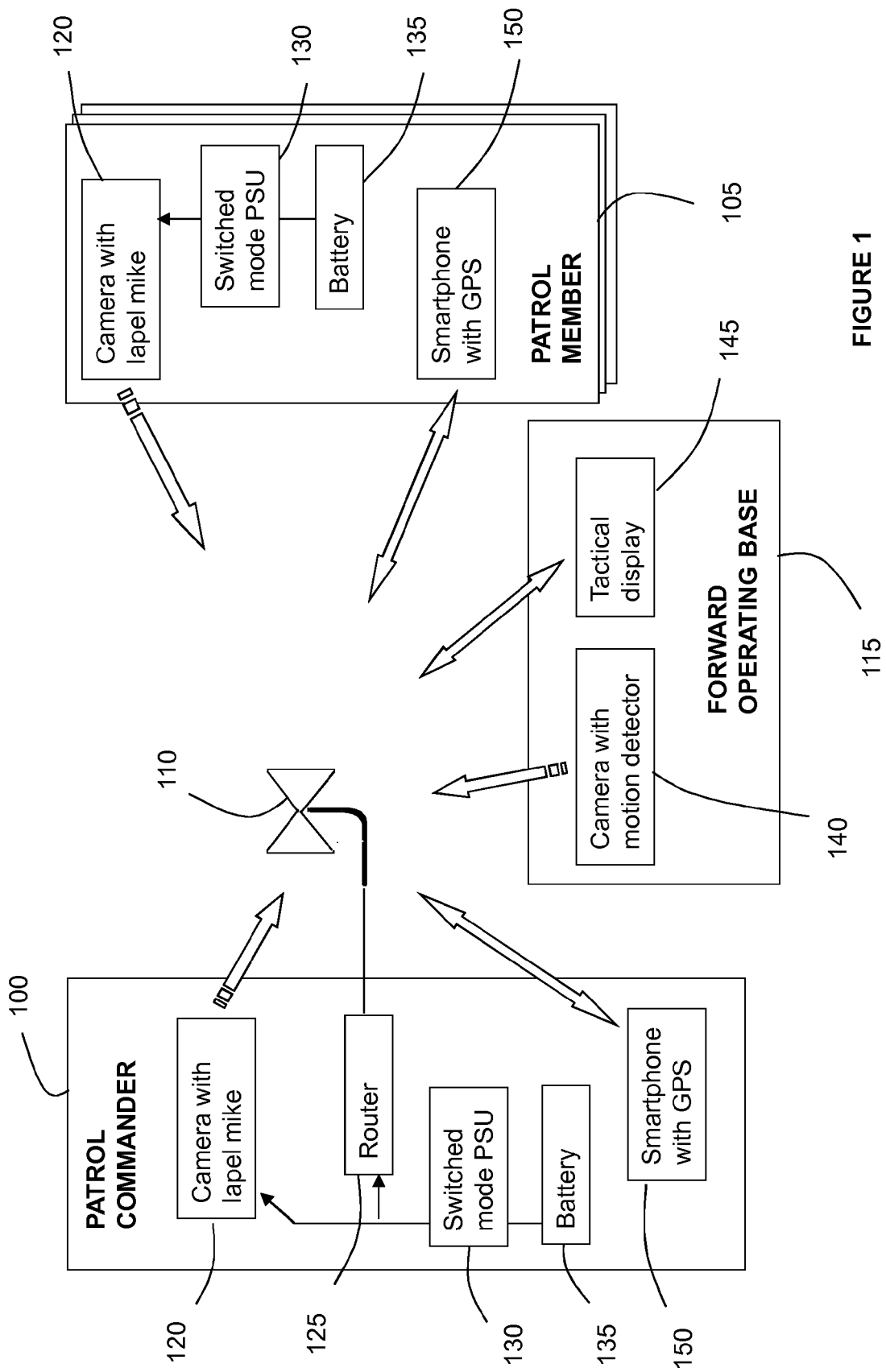
FIG. 1 shows a schematic block diagram of functional units of the network.

Referring to FIG. 1, the portable wireless network in this embodiment is intended for use by a military group in the field, such as a ground patrol. It provides communication between three types of entity or location, these being a patrol commander 100, a set of patrol members 105 and a forward operating base 115 ("FOB"). There may of course be other entities or locations involved, and different distributions of equipment might be used.

In the British Army, a patrol traditionally consists of two four-man "fire teams" designated Charlie and Delta, one of the four in each case being a fire team leader 100. Effective communication between the eight team members 100, 105 is critical to ensuring that patrols can operate to achieve their mission objectives.

One of the fire team leaders 100 is equipped with a camera 120 and a router 125, both powered from a portable battery pack 135 via a switched mode power supply unit ("SMPSU") 130 for efficient delivery of a regulated voltage. The fire team leader 100 also has a smartphone 150 which conventionally has its own power supply, and a wearable antenna 110.

Each other patrol member 105, including the second fire team leader 100, similarly has a camera 120, again powered from a portable battery pack 135 via a SMPSU 130, and a smartphone 150.

The forward operating base 115 has one or more pieces of equipment that might usefully exchange information with the ground patrol, such as a camera with motion detection 140 and a tactical display unit 145.

In use, all of the input devices, such as the cameras with lapel microphones 120, smartphones 150 with GPS data inputs to make, the FOB camera 140 and the tactical display unit 145, transmit their data wirelessly for receipt by the router 125 which provides a wireless access point. The router 125 picks up these information feeds via the antenna 110 and re-transmits them in known manner onto a wideband, wireless local area network (WLAN).

In more detail, the input devices transmit their data in packet format, therefore offering source and destination addresses. The router 125 receives and re-transmits these on the WLAN for selective receipt by the smartphones 150 by means of the source addresses. Within the one network, this function can be supported by the access point of the router 125, running in infrastructure mode which is relatively efficient in terms of network management and also offers a degree of stability and scalability in the field. Any data packets arriving from another network can still be fed into the WLAN by the router 125.

Figure 2:
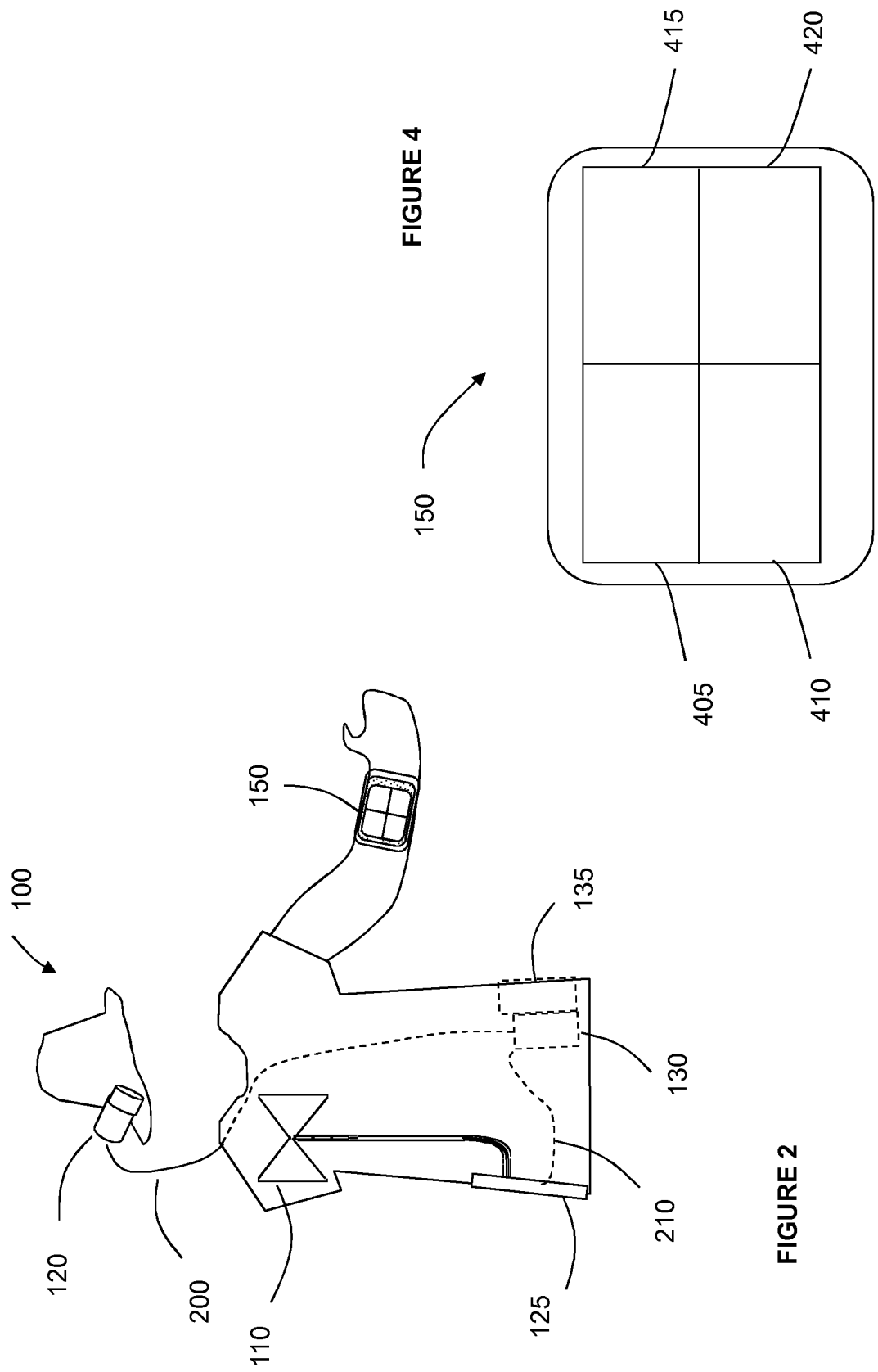
FIG. 2 shows a schematic diagram of functional units as they might be worn in the field.

Referring to FIG. 2, all of the equipment is designed to exploit a wireless network based on the 802.11n protocol of the IEEE and can be provided by modified versions of low power, commercial-off-the-shelf ("COTS") electronic equipment integrated into combat clothing. For example, the equipment carried by the patrol commander 100 includes a helmet-mounted camera 120 with lapel microphone, a wrist-worn smartphone 150 with WLAN, or "WiFi", capability, a body-wearable antenna 110 integrated into the shoulder of the commander's clothing, a COTS 802.11n router 125 in a pocket or attached to a belt, and a battery pack 135 and SMPSU 130 also in a pocket or attached to a belt. The antenna 110 is a wideband bow-tie with integrated balun, supporting high data rates and designed to counter body de-tuning. Power supply lines 200, 210 feed the camera 120 and router 125. Other examples of antenna might also be used such as broadband spirals or sinuous designs to obtain similar performance and perhaps different polarisations.

The equipment offers good propagation characteristics and a channel bandwidth of 40 MHz which supports the required data rate, in the unlicensed Industrial Scientific and Medical ("ISM") band. The ISM band is, for 802.11n, divided into around 13 overlapping channels from 2412 MHz to 2472 MHz, each channel consisting of several thousand sub-carriers with bandwidths of a few tens of kHz. The maximum theoretical transmission rate supported by 802.11n in this channel bandwidth is around 600 Mb/s but using only one antenna and taking packet overheads into account, data rates of at least 50 Mbps, for instance 72 Mbps, are realised, this being more than sufficient for embodiments of the invention. By using a Coded Orthogonal Frequency Division Multiplexing ("COFDM") modulation scheme, the equipment is made resistant to multipath problems and tolerant to jamming. Security is provided through use of the Advanced Encryption Standard ("AES"), for instance using a 128 bit cipher.

Only one wireless router 125 is shown but it would be possible to use more than one. The router 125 itself need be no larger than a smart phone 150 so the probability of it being damaged or destroyed when appropriately ruggedized may be relatively low. However, if there were thought to be a risk that the router 125 could be taken out of action, it would be possible to give two or more members of the patrol a router 125 and use an ethernet bridge (IEEE 802.1D) or repeater. In the following description, only one router 125 is assumed.

Additionally, only one body wearable antenna 110 is shown. Even when shoulder-mounted, a single antenna can suffer signal blockage by the human body when lying in various positions. It is therefore preferred that at least a second antenna 110 is provided elsewhere on the body, using a diplexer or a multiplexer, to maintain the best available link for all body positions. This is relatively simple to implement in unbalanced line. Further details of the body worn antenna are given below.

In use, signals are relayed from wireless information devices carried or worn by the patrol members, such as the cameras 120 and their lapel microphones and GPS components of the smart phones 150, to the router 125 via the body wearable antenna 110. An estimate of the data rate for each data type is provided below:

Voice—digitisation of the audio spectrum from 300 Hz to 3.4 kHz is regarded as acceptable for voice communications, maintaining reasonable fidelity. This 3 kHz bandwidth, sampled at 6 kHz (selected according to Nyquist's Theorem) and assuming an 8 bit analogue to digital converter (ADC) gives an uncompressed, uncoded rate of 48 kbps.

Video—if simple VGA resolution is used (640 by 480 pixels), assuming an 8 bit colour depth for 3 pixel colours, then each frame would consist of 7.37 Mb (0.92 MB). At 25 frames per second (fps) this results in an un-encoded rate of 184 Mbps.

GPS data is typically output in NMEA 0183 format at a rate of 4.8 kbps.

Regarding the voice signals, because the network is Ethernet-based, it will be realised that these need to be digitised via an analogue to digital converter (ADC) and compressed via a codec before being packet switched to give a packetised data stream on the network.

Both voice and video are subject to variable compression of a factor of fifty as a rule of thumb via MPEG-4 encoding. It can clearly be seen that the voice and GPS contribution is negligible relative to the video rate requirement. Hence, a compressed rate of 3.7 Mbps is required for each individual carrying the equipment or 29.5 Mbps (3.7 MB/s) for an eight man section.

If a reasonable link is assumed, individual sub-carriers of a COFDM scheme utilise 64QAM (Quadrature Amplitude Modulation), a 6 bit modulation scheme with a ⅔ Forward Error Correction (FEC), leading to a symbol rate of 29.5/6*3/2=7.4 MSym/s baud rate.

Under adverse signal to noise conditions, the modulation scheme of individual sub-carriers and the extent of FEC may change. If 16QAM, a 4 bit modulation scheme is selected, and the FEC increased to 2:1, then a baud rate of 29.5/4*2=14.8 MSym/s would be required to support that data rate.

The signal to noise ratio and link margin can be estimated for particular scenarios, perhaps the simplest being direct line of sight at the maximum range over which the system is likely to be required to operate. This corresponds to transmission between the body worn antenna of the router and the smartphone PIFA/FICA/slot antenna on the wrist of an individual assumed to be a maximum of 100 m away. The input power to the BWA was 10 dBm, with a −5 dBi gain measured on average in the azimuth plane with a human body present, giving a power density incident upon the receive antenna which may be estimated by the following equation:

$$P_\rho = \frac{P_T G_T}{4\pi R^2} \quad (i)$$

$P_T$, $G_T$ and R are the transmit power, transmit antenna gain and range respectively, giving a power density at the receive antenna of 0.025 µW/m² (−46 dBm/m²). The received power, receive antenna gain being considered, is given by the product of the power density at the receive antenna and the effective aperture area as follows:

$$P_R = \frac{G_R \lambda^2 P_\rho}{4\pi} \quad (ii)$$

$G_R$ is the receive antenna gain. Smartphone antenna gain is generally reported for the GSM bands. A value of −10 dBi was used here, giving a received power of $3.0*10^{-12}$ W (−85.2 dBm) at 2.45 GHz. Assuming a receiver bandwidth of 40 MHz and a temperature of 25° C., the noise equivalent power for this bandwidth was found to be $1.645*10^{-13}$ W (−97.8 dBm). The signal to noise ratio is given by:

$$SNR = \frac{P_T G_T G_R \lambda^2}{4\pi R^2 P_N FL} \quad (iii)$$

$P_N$ is the noise equivalent power (kTB) whilst F and L are the receiver noise figure and system losses before the receiver, assumed to be 2 dB and 1 dB respectively. These yield a signal to noise ratio over the band starting at 9.68 dB at 2.43 GHz dropping linearly to about 9.535 dB at 2.47 GHz. This is at the limit of the transmission distance. It was found that extending the distance even by a few metres caused the signal to be progressively degraded.

Estimating the noise spectral density ($N_0$=kTFL) to be −171 dBm and the energy per symbol $E_s$ to be −151 dBm for a 1 in $10^6$ bit error ratio, if we assume a 29.5 Mbit/s data rate, and 6 bit modulation scheme then the required signal power is −83.9 dBm. This is the energy needed to maintain this data rate with the above bit error ratio. The link margin is simply the actual power at the receiver to that required to maintain this rate. This was found to be −1.22 dB at 2.43 GHz, changing linearly to −1.36 dB at 2.47 GHz suggesting that this exceeded the maximum operating distance at full data rate. That is, because the link margin at 100 m could be seen to be slightly negative, the distance is probably at the limit of reception and a reduction in the data rate had probably occurred.

Regarding the body worn antenna 110, a suitable antenna and feed structure are described in co-pending British patent application GB 1010988.2 by the present applicant. This discloses a feed structure for a wearable bowtie antenna incorporating a transmission line designed for mounting on opposite sides of a fabric. Together with an integrated balun, the transmission line converts a radio output to a balanced antenna feed and, for embodiments of the present invention, the latter is selected for use with the 2.45 GHz 802.11n based equipment of the wireless network. The conductive material contains a nylon rip stop to help increase durability. In addition, the material has been subject to a number of low temperature washing cycles with no notable adverse effects on its appearance or electrical performance.

Figure 3:
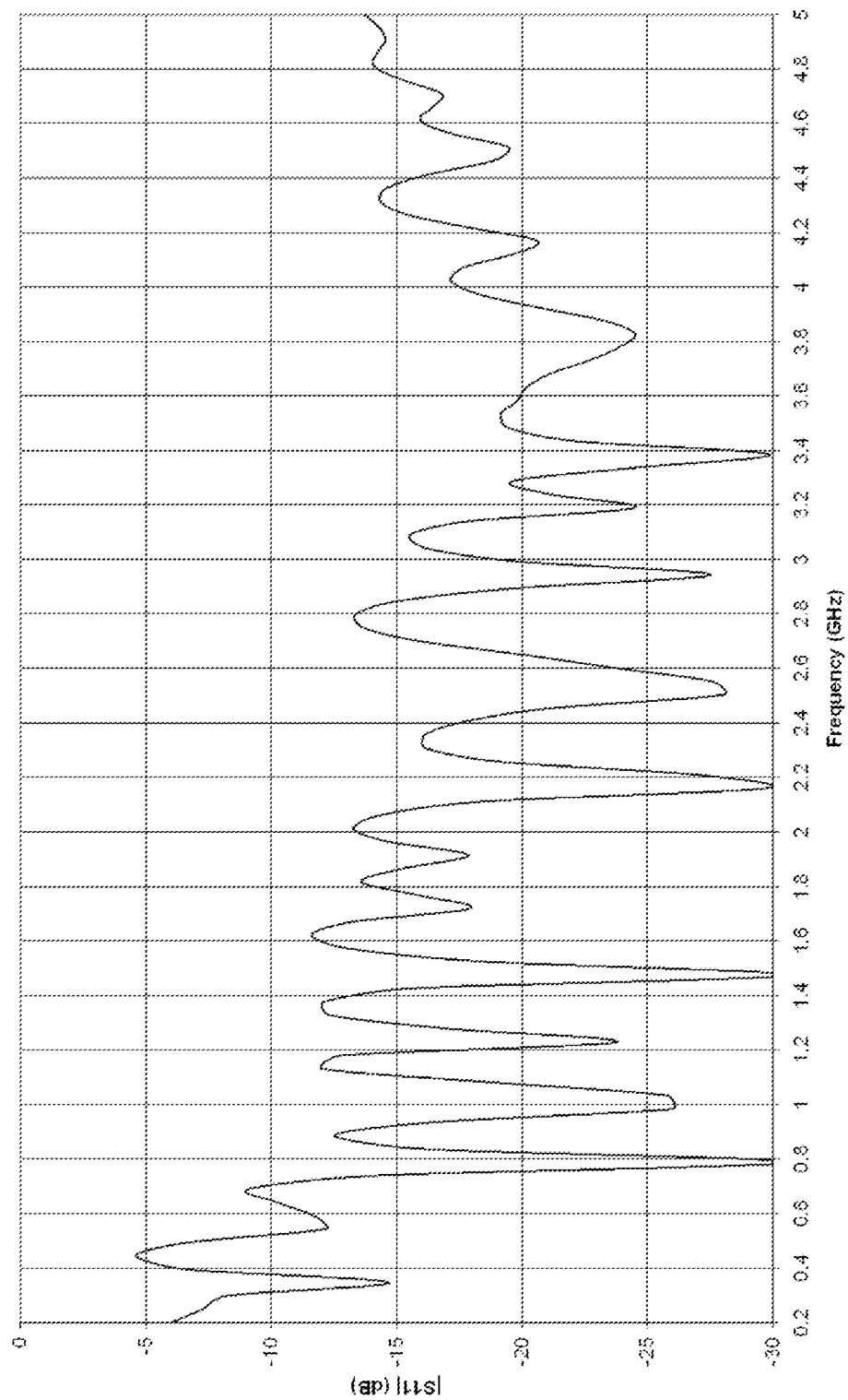
FIG. 3 shows a graph of the match to free space of a body wearable antenna for use in the network of FIG. 1.

Referring to FIG. 3, a chest-mounted, horizontally polarised, wide bandwidth (6:1) antenna 110, including the balun, was measured using an 8510C Vector Network Analyser. (6:1 will be understood as the ratio of the start and stop frequencies over which the antenna is well-matched and therefore functions.) The measured results show the reflection loss of the antenna 110 in free space (away from the body). It can be seen that a good match was achieved from around 800 MHz to 5 GHz, giving a useable fractional bandwidth of around 144% at better than −12 dB (1.67:1). Over the 2.4-2.5 GHz band of interest a match of better than 1.3:1 was achieved. The de-tuning effect of bringing the antenna in proximity to the human body (with a 2 mm fabric spacer) was found to amount to a frequency shift of only a few tens of MHz, very small relative to the available bandwidth. Flexing of the antenna and garment movement appeared to have a more significant impact.

Radiated power adjustment is mentioned above. Increasing the output power from say 0.1 mW to perhaps 10 mW improves signal to noise. This can be done provided the antenna remains, in use, within the ISM band broadcast limits for effective radiated power (ERP), taking directivity into account.

It might be found preferable to use another antenna design, for example a smaller antenna with reduced bandwidth but vertically polarised and shoulder or helmet mounted.

Embodiments of the invention provide a portable area network in which all channels can be available, all the time. This offers real time sharing of voice, video and positional data amongst individuals using modified COTS equipment to form a distributed wireless network. The packet router 125 can transmit the information feeds it is receiving separately from each patrol member and from elsewhere, such as from a forward operating base 115, out to all the patrol members. Each smartphone 150 can potentially receive all the information feeds and each member of the patrol can use their smartphone application to select which feed(s) to receive at any one time.

Embodiments of the invention offer major operational advantages, such as:
  The sharing of phone, digital compass, accelerometer, video log data.
  Electrical robustness of the network, ie secure, jam resistant and tolerant to multipath, making it useful in hostile environments and different terrain types such as mountains or caves.
  Can be lightweight and low power, minimising the burden on the dismounted soldier.
  Improved situational awareness, particularly used with voice for target cueing, and avoidance of friendly fire.
  Ease of implementation Referring to FIG. 4, a smartphone screen showing multiple information feeds 405, 410, 415, 420 is run from a software application installed on the smartphone 150. Every packetized information feed includes an identifier for the relevant source in the packet header. It is relatively simple for an application to provide a selection mechanism for the user to select which information feeds to display on their smartphone screen at any one time.

Regarding scalability, in the system described above, the use of an Internet Protocol limits the number of sources of packets being transmitted on the network to 255. In practice, eight users will require 27 Mbps data rate whilst the system already has capacity of 72 Mbps extendable to around 250 Mbps. Although the range of the body wearable antenna measured with regard to FIG. 3 was limited to 100 m, this is not thought to be a maximum but a characteristic of the antenna selected for measurement.

In general, equipment compliant with the IEEE 802.11n-2009 standard was found to be ideal for intra-patrol communications. With the use of improved antennas to increase realized gain and so improve range relative to COTS equipment, a high capacity, multipath tolerant, secure and jam resistant network was formed. The system created a range of possibilities to improve situational awareness of patrol members by establishing a wireless network over which a range of data types can be effectively shared in real time. Being able to share differing views of an area between geographically dispersed individuals or from remote fixed cameras at specific locations has the potential when combined with voice and positional data to bring a number of tactical benefits.

It might be noted that if a router 125 and/or its antenna 110 become lost to the network and an access point is therefore lost for some or all of the devices communicating via the WLAN, it remains an option to move the devices to ad hoc mode rather than infrastructure mode. No access point is required with the 802.11 protocol which will manage the network with regard to packet collisions and the like. The information devices supplying feeds to the network, such as the cameras 120 and their lapel microphones and GPS components of the smart phones 150, would simply be changed to broadcast mode so that they constantly stream data onto the network. This would mean path lengths are potentially longer as the data is transmitted point to point between devices rather than via the router 125, external feeds might be lost and performance can deteriorate, for example as the network topology becomes changeable. Further, a disadvantage of all devices broadcasting simultaneously in an unregulated way potentially increases latency (network time where meaningful information isn't being received) and reduces security.

However, it allows a network to remain in operation.

The invention claimed is:

1. A portable wireless network comprising:
   a fabric having a first side and a second side;
   a transmission line formed from a first conductive material and mounted on the first side of the fabric;
   at least one portable router coupled to the transmission line, the at least one portable router configured to provide routing of information between multiple wireless devices in a local area network; and
   a first wearable antenna formed from a second conductive material and mounted on at least one of the first side of the fabric and the second side of the fabric, the first wearable antenna connected to the router via the transmission line, the first wearable antenna configured to receive and/or transmit at least a portion of the information between the wireless devices via the local area network.

2. A network according to claim 1 wherein the local area network supports wideband communications and the first wearable antenna comprises a wideband antenna.

3. A network according to claim 1 wherein the router provides packet-based routing and the wireless devices have packet-based communications capability.

4. A network according to claim 1, wherein the router provides a wireless access point for supporting the local area network in infrastructure mode.

5. A network according to claim 1, further comprising:
   two or more portable wireless information generating devices for generating digital information and transmitting it to the router for transmission on the local area network.

6. A network according to claim 1, further comprising:
two or more portable wireless user communication interfaces for receiving the digital information via the local area network for delivery to a user.

7. A network according to claim 1, including two or more portable wireless information generating devices for generating digital information and transmitting it to the router for transmission on the local area network, wherein the two or more portable wireless information generating devices comprise one or more of: cameras; microphones; GPS equipment; compasses; gyroscopes and accelerometers.

8. A network according to claim 1, including two or more portable wireless user communication interfaces for receiving the digital information via the local area network for delivery to a user, wherein the interfaces are capable of delivering to the user more than one information feed at a time.

9. A network according to claim 1, including two or more portable wireless user communication interfaces for receiving the digital information via the local area network for delivery to a user, wherein the interfaces are capable of delivering to the user more than one type of information feed.

10. A network according to claim 1, including two or more portable wireless user communication interfaces for receiving the digital information via the local area network for delivery to a user, wherein the interfaces are capable of delivering to the user a video data feed.

11. A network according to claim 1, including two or more portable wireless user communication interfaces for receiving the digital information via the local area network for delivery to a user, wherein the interfaces support a packet-based communication protocol, have a visual display component and an operating system for supporting software applications.

12. A network according to claim 11 wherein the user communication interfaces support selection of two or more feeds from selected information generating devices for delivery at the same time.

13. A network according to claim 1, further comprising at least one non-portable information generating device.

14. A network according to claim 1, supporting a data rate, in use, of at least 50 Mbps.

15. A network according to claim 1, supporting a wideband communication protocol to provide resistance to jamming.

16. A network according to claim 15 wherein the protocol comprises coded orthogonal frequency division multiplexing ("COFDM") modulation scheme, in use.

17. A portable wireless network comprising:
a transmission line formed from a first conductive material and mounted on a first side of a fabric;
at least one portable router coupled to the transmission line, the at least one portable router configured to provide routing of information between multiple wireless devices in a local area network;
at least one wearable antenna formed from a second conductive material and mounted on at least one of the first side of the fabric and a second side of the fabric, the at least one wearable antenna connected to the router via the transmission line, the at least one wearable antenna configured to receive and/or transmit the information between the wireless devices via the local area network;
two or more portable wireless information generating devices for generating digital information and transmitting it to the router for transmission on the network; and
two or more portable wireless user communication interfaces for receiving the digital information via the network for delivery to a user.

18. A network according to claim 17 wherein the local area network, devices and interfaces support encrypted communication.

19. A network according to claim 18 wherein the encrypted communication uses at least a 128 bit cipher.

20. A network according to claim 17 wherein the wearable wideband antenna has a transmission/reception range in air of at least 100 meters.

21. A network according to claim 1 wherein the transmission line and the first wearable antenna are on opposite sides of the fabric.

22. A network according to claim 1 further comprising a second wearable antenna formed from the second conductive material and mounted on at least one of the first side of the fabric and the second side of the fabric, the second wearable antenna connected to the router via the transmission line, the second wearable antenna configured to receive and/or transmit at least a portion of the information between the wireless devices via the local area network.

* * * * *